US 8,286,974 B2

(12) United States Patent
Chen et al.

(10) Patent No.: US 8,286,974 B2
(45) Date of Patent: Oct. 16, 2012

(54) EASY-TO-ASSEMBLE MULTIPURPOSE PUSHBIKE (75) Inventors: Hsin-Ta Chen, Taichung (TW); Hsing-Hung Chen, Changhua County (TW); Ya-Fen Chen, Changhua County (TW)

(73) Assignee: Hsin-Ta Chen, Taichung (TW)

( * ) Notice: Subject to any disclaimer, the term of this patent is extended or adjusted under 35 U.S.C. 154(b) by 0 days.

(21) Appl. No.: 13/240,064

(22) Filed: Sep. 22, 2011

(65) Prior Publication Data
US 2012/0187650 A1 Jul. 26, 2012

(30) Foreign Application Priority Data

Jan. 26, 2011 (TW) .............................. 100201738 U (51) Int. Cl.
*B62M 1/00* (2010.01)
(52) U.S. Cl. ..................... 280/1.188; 280/828; D12/111
(58) Field of Classification Search ............... 280/1.183, 280/1.23, 1.188, 828; D12/111
See application file for complete search history.

(56) References Cited

U.S. PATENT DOCUMENTS

| D50,882 S | * | 6/1917 | Case | D12/112 |
| D56,415 S | * | 10/1920 | Case | D12/112 |
| 1,587,930 A | * | 6/1926 | Wetzel | 280/223 |
| D83,033 S | * | 1/1931 | Cottam | D12/108 |
| 1,910,018 A | * | 5/1933 | Jones | 280/7.17 |
| D139,802 S | * | 12/1944 | Hanscom | D12/112 |
| D157,322 S | * | 2/1950 | Baretta | D12/111 |
| 2,759,736 A | * | 8/1956 | Block | 280/1.182 |
| D231,345 S | * | 4/1974 | Gutknecht | D12/111 |
| D504,845 S | * | 5/2005 | Coerschulte | D12/111 |
| D537,758 S | * | 3/2007 | Grepper | D12/111 |
| D561,649 S | * | 2/2008 | Latham | D12/111 |
| D567,149 S | * | 4/2008 | Grepper | D12/111 |

* cited by examiner

*Primary Examiner* — Tony Winner
(74) *Attorney, Agent, or Firm* — Muncy, Geissler, Olds & Lowe, PLLC (57) ABSTRACT An easy-to-assemble multipurpose pushbike includes a frame having a handlebar at one end, a through hole on the middle and a locating member disposed in the through hole, a front wheel pivotally coupled to the other end of the frame, two arched boards each having a mounting portion disposed at one end and inserted into the through hole of the frame, a pivot holder disposed at the other end and two positioning matching means disposed at the mounting portion and selectively attached to the locating member, a rear wheel set pivotally coupled to the pivot holder of each arched board, and a seat having a seat pad and a seat stem supporting the seat pad and fixedly mounted between the arched boards.

14 Claims, 7 Drawing Sheets

EASY-TO-ASSEMBLE MULTIPURPOSE PUSHBIKE

BACKGROUND OF THE INVENTION

1. Field of the Invention

The present invention relates to children learning equipment and more particularly, to a multipurpose pushbike for children, which is easy to assemble.

2. Description of the Related Art

During growing of children, different learning products may be used in different children development stages to assist children in learning different skills. However, these learning products are transitional products that have a short service period and become cumbersome after the service period. Imperceptibly, it becomes waste when learning products are not used after the service period. Therefore, it is desirable to provide a children learning product that is changeable to a different form for use in a different child developing stage to fit different learning requirements, extending product service period and reducing waste.

SUMMARY OF THE INVENTION

The present invention has been accomplished under the circumstances in view. It is the main object of the present invention to provide an easy-to-assemble multipurpose pushbike, which uses same basic component parts to construct a product in one of multiple forms by means of different joining methods for use in different child developing stages to fit different learning requirements.

To achieve this and other objects of the present invention, an easy-to-assemble multipurpose pushbike comprises: a frame having one end thereof equipped with a handlebar, the frame comprising a locating member; a front wheel having a wheel axle pivotally coupled to the opposite end of the frame; two arched boards clamped on two opposite lateral sides of the locating member, each arched board comprising a mounting portion located on one end thereof, a pivot holder located on an opposite end thereof, a connection portion located on a middle part thereof, and two positioning matching means disposed in an inner side of the mounting portion and selectively attached to the locating member, each positioning matching means having a respective axial direction; a rear wheel set pivotally coupled between the pivot holders of the arched boards for free rotation relative to the arched boards; and a seat comprising a seat pad and a seat stem, the seat stem being set between the two arched boards and affixed to the connection portion of each arched board.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1~4, an easy-to-assemble multipurpose pushbike in accordance with a first embodiment of the present invention is shown comprising a frame 10, a front wheel 20, two arched boards 30, a rear wheel set 40, a seat 50 and two buffer members 60.

The frame 10 comprises a handlebar 11 located on one end thereof for the grasping of the user's both hands. The handlebar 11 can be formed integral with the top end of the frame 10. Alternatively, the handlebar 11 can be separately made and then affixed to the top end of the frame 10. The other end of the frame 10 terminates in a fork 13 that comprises a pivot holder 14 at each of the two ends thereof. A through hole 15 is located on the middle part of the frame 10. The frame 10 further comprises a locating member 16 disposed in the through hole 15.

The front wheel 20 comprises a wheel axle 21 pivotally connected between the two pivot holder 14 in the fork 13 of the frame 10. Thus, the front wheel 20 is freely rotatable relative to the frame 10.

The two arched boards 30 each comprise a mounting portion 31 located on one end, a pivot holder 32 located on the other end, and a connection portion 33 located on the middle. Each arched board 30 further comprises two positioning matching means 34, for example, retaining tubes or through holes or round rods or retaining grooves disposed in the mounting portion 31. In this embodiment, the two retaining grooves 34 are located on the inner side of each arched board 30. The two retaining grooves 34 respectively extend from one side edge of the respective arched board 30 to the other side edge. Further, the two retaining grooves 34 have a respective axial direction. The two arched boards 30 are inserted with their respective one ends into the through hole 15 of the frame 10. The aforesaid locating member 16 is kept between the two arched bars 30 and positioned in one retaining groove 34 of the mounting portion 31 of each arched board 30. By means of the retaining grooves 34, the locating member 16 is retained between the two arched boards 30, and then the mounting portions 31 of the arched boards 30 are fixedly fastened together with screw bolts. In this embodiment, the arched boards 30 are joined to the frame 10 by means of the retaining grooves 34 that have a first axial direction (the other groove of each arched board has a second axial direction), and therefore the arched boards are kept in a smoothly arched and upwardly curved configuration after fixation to the frame 10.

The rear wheel set 40 is pivotally mounted between the pivot holders 32 of the arched boards 30. In this embodiment, the rear wheel set 40 consists of one single rear wheel having a wheel axle 41 pivotally coupled between the two arched boards 30 for free rotation.

The seat 50 comprises a seat pad 51 and a seat stem 52. By means of the seat stem 52, the seat 50 is fixedly connected between the connection portions 33 of the arched boards 30. In this embodiment, the seat stem 52 comprises a plurality of screw holes arranged at different elevations and selectively fastened to the connection portions 33 of the arched boards 30 with screw bolts. Thus, the seat 50 can be selectively affixed to the arched boards 30 in one of a series of elevational positions.

The two buffer members 60 are respectively set between the two arched boards 30 and the two opposing lateral walls of the through hole 15 of the frame 10. Subject to the arrangement of the buffer members 60, the safety level of the pushbike is enhanced.

The easy-to-assemble multipurpose pushbike in accordance with the first embodiment of the present invention enables a young child to sit thereon and to push against the floor with the both legs in learning walking. Further, the component parts of the pushbike is not limited to wood, metal tube or plastics.

Figure 1:
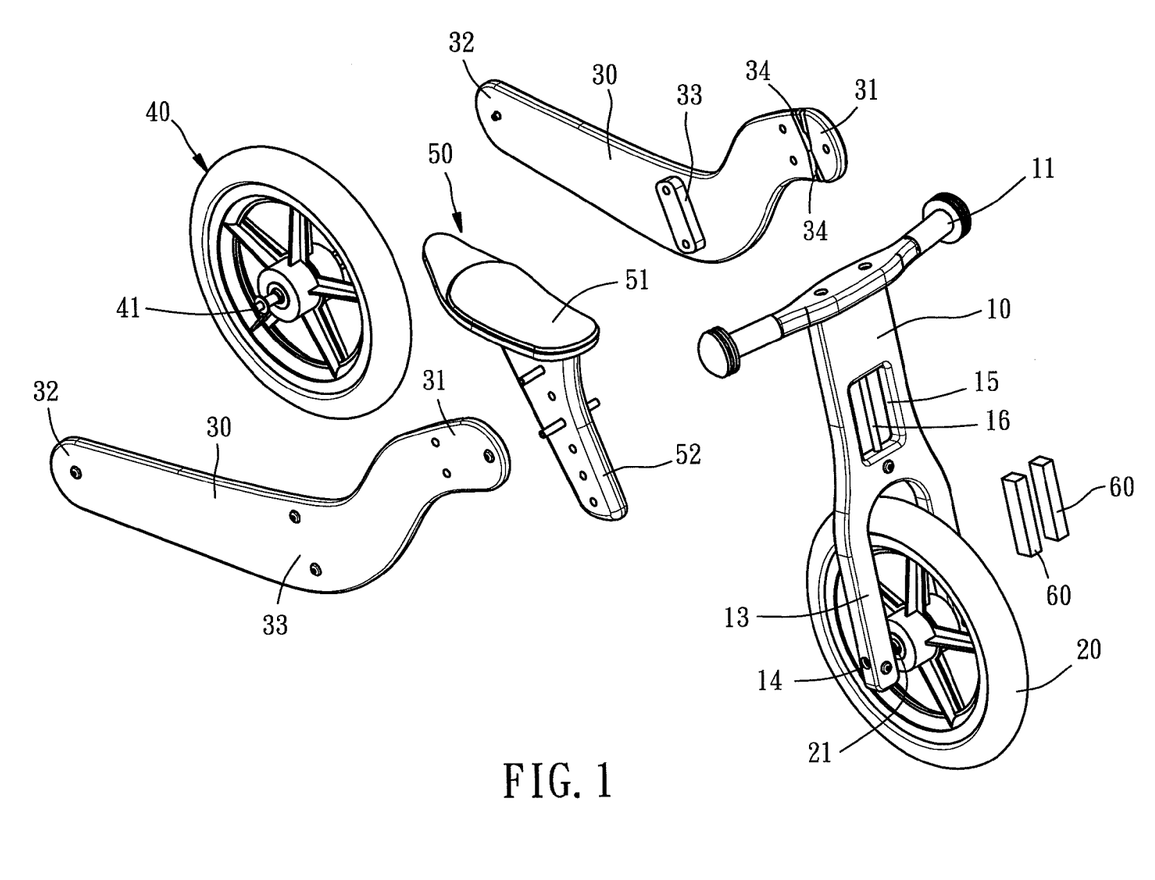
FIG. 1 is an exploded view of an easy-to-assemble multipurpose pushbike in accordance with a first embodiment of the present invention.
Figure 2:
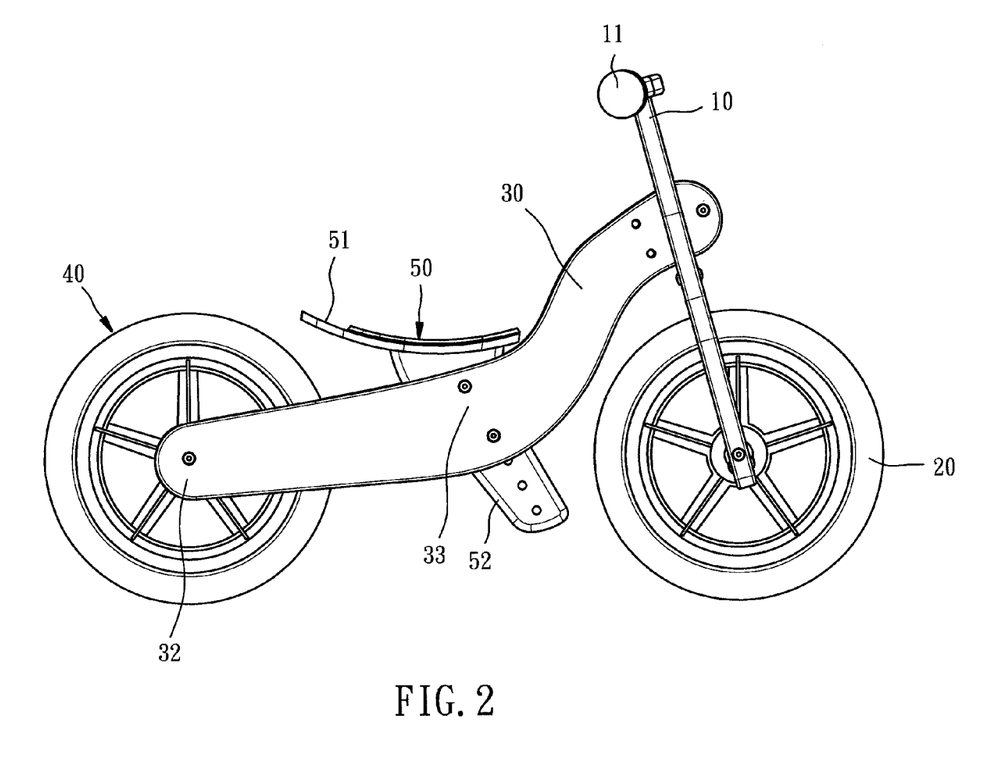
FIG. 2 is a side view of the easy-to-assemble multipurpose pushbike in accordance with the first embodiment of the present invention.
Figure 3:
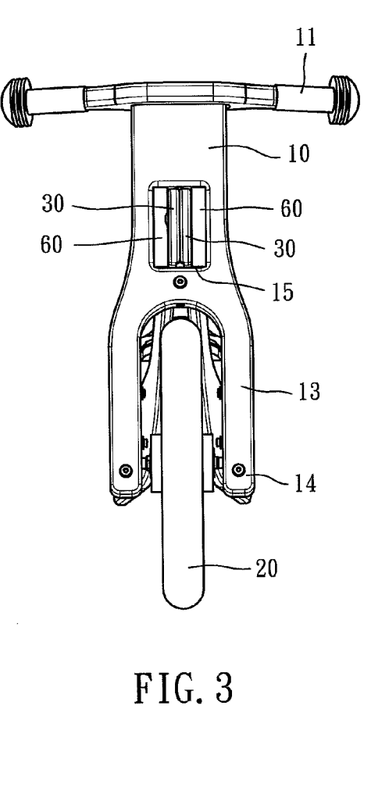
FIG. 3 is a front view of the easy-to-assemble multipurpose pushbike in accordance with the first embodiment of the present invention.
Figure 4:
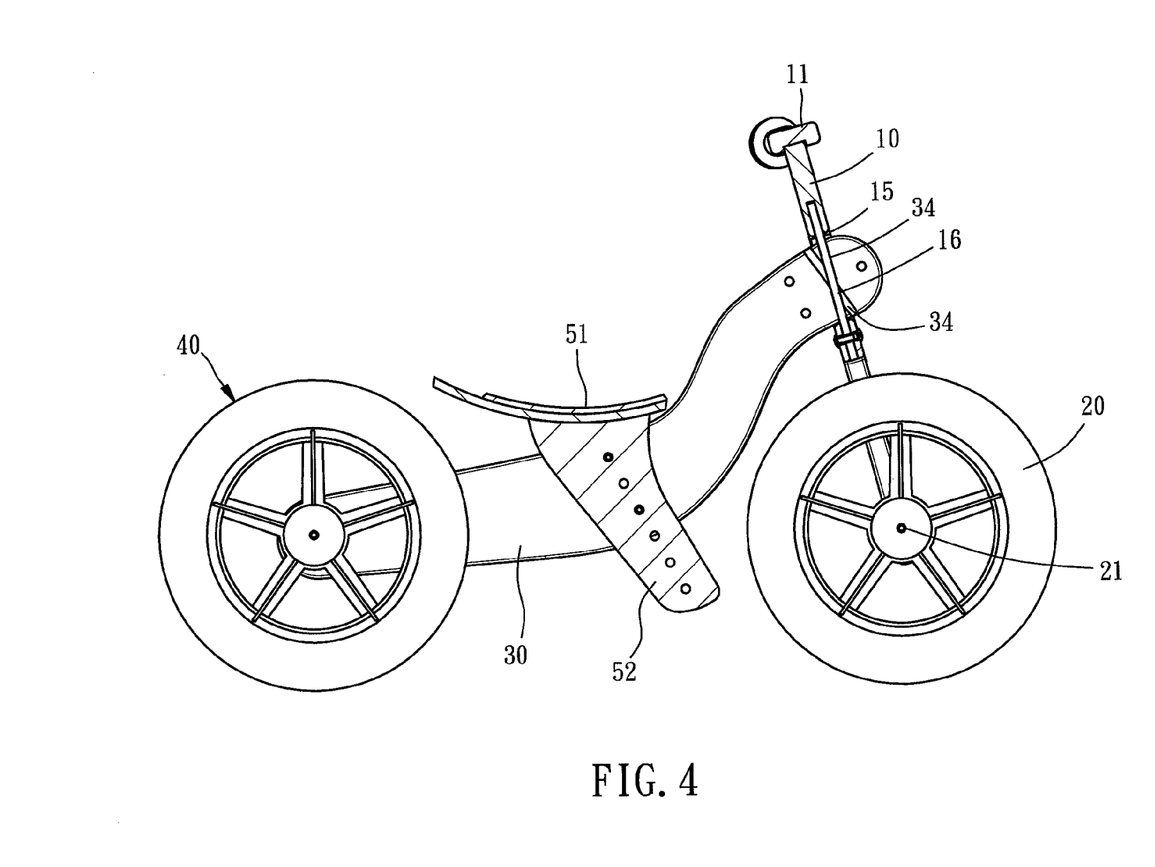
FIG. 4 is a side view of the easy-to-assemble multipurpose pushbike in accordance with the first embodiment of the present invention after removal of one arched board.
Figure 5:
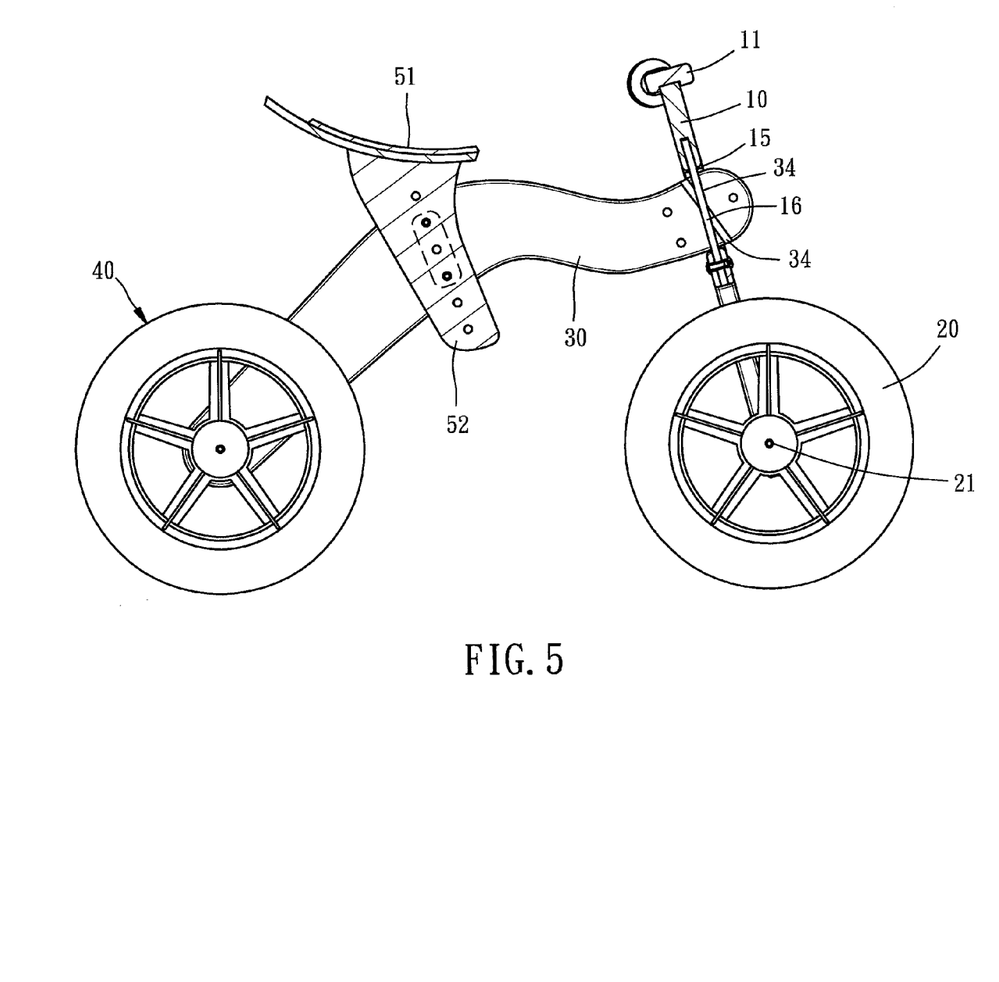
FIG. 5 is a side view of an easy-to-assemble multipurpose pushbike in accordance with a second embodiment of the present invention after removal of one arched board.

FIG. 5 illustrates an easy-to-assemble multipurpose pushbike in accordance with a second embodiment of the present invention, which is practical for older and taller children. As illustrated, the easy-to-assemble multipurpose pushbike in accordance with this second embodiment also comprises a frame 10, a front wheel 20, two arched boards 30, a rear wheel set 40 and a seat 50. Unlike the aforesaid first embodiment, the two arched boards 30 curve downwards so that the elevation of the seat 50 is relatively higher when compared to the aforesaid first embodiment. Thus, this second embodiment is suitable for relatively taller children. The connection between the two arched boards 30 and the frame 10 is affixed in the same manner as the aforesaid first embodiment, however, each arched board 30 is secured to the locating member 16 by means of the other retaining groove 34 (that have a second axial direction). For a younger child not suitable for riding a two-wheel vehicle, an additional rear wheel can be added, i.e., the rear wheel set 40 can be formed of two rear wheels and one wheel axle 41. The two rear wheels are pivotally coupled to the pivot holders 32 by the wheel axle 41, and disposed at an outer side relative to the two arched boards 40. Thus, the multipurpose pushbike works as a tricycle.

Except the aforesaid two embodiments, modifications can be made to the easy-to-assemble multipurpose pushbike as follows:

For example, the easy-to-assemble multipurpose pushbike can simply comprise or use one single arched board. Alternatively, the easy-to-assemble multipurpose pushbike can simply comprise or use one single buffer member to match with either of the aforesaid first and second embodiments.

Alternatively, the arched board can be affixed to the frame by another type of fastening devices (not shown) to have the locating member be set in one retaining groove of the arched board. Thus, one single arched board can be affixed to the frame, and it is not imperative to use two arched boards.

Figure 6:
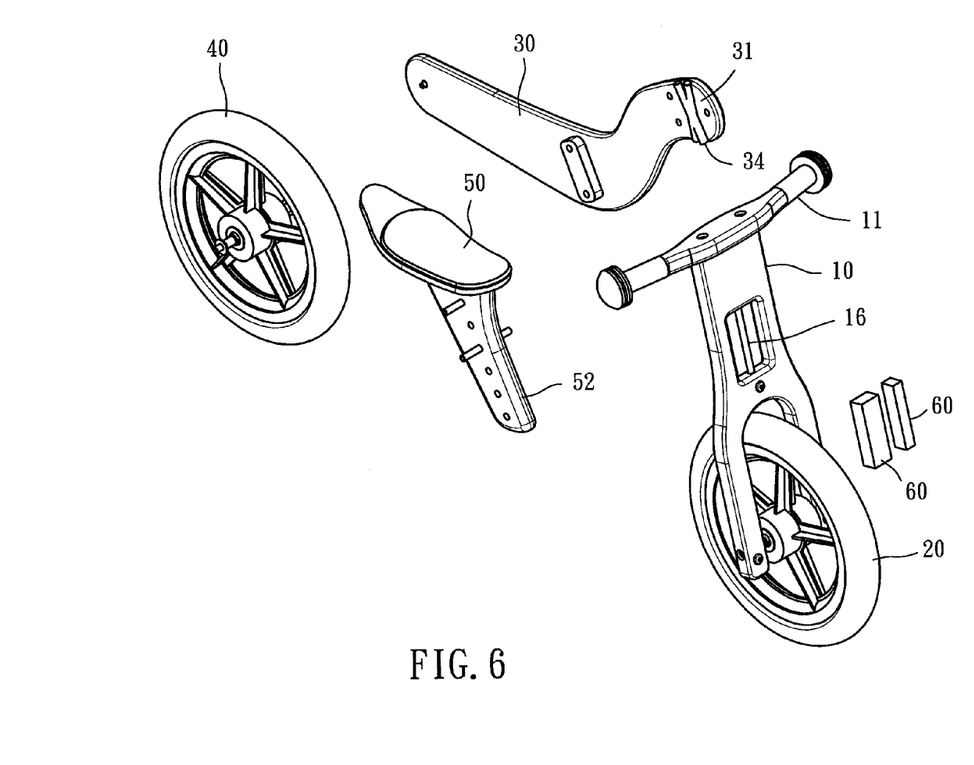
FIG. 6 is an exploded view of an easy-to-assemble multipurpose pushbike in accordance with a third embodiment of the present invention.
Figure 7:
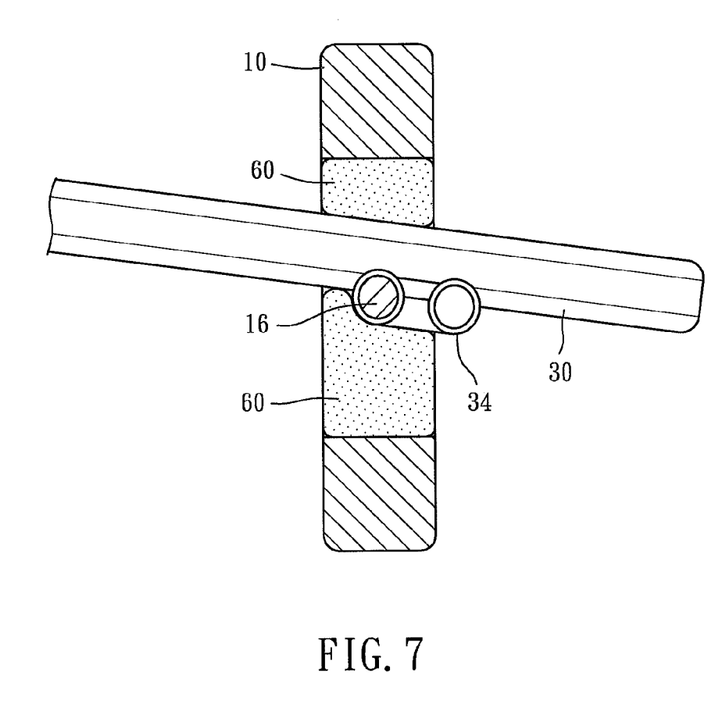
FIG. 7 is a schematic sectional view of a part of the easy-to-assemble multipurpose pushbike in accordance with the third embodiment of the present invention, illustrating the connection structure between the frame and the arched boards.

FIGS. 6 and 7 illustrate an easy-to-assemble multipurpose pushbike in accordance with a third embodiment of the present invention. Similar to the aforesaid first embodiment, the easy-to-assemble multipurpose pushbike in accordance with this third embodiment also comprises a frame 10, a handlebar 11, a locating member 16, a front wheel 20, a rear wheel set 40, a seat 50, and two buffer members 60. Unlike the aforesaid first embodiment, this third embodiment simply uses one single arched board 30. The arched board 30 comprises a mounting portion 31 located on one end, a pivot holder 32 located on the other end, a connection portion 33 located on the middle, and two positioning matching means, for example, retaining tubes 34 disposed in the mounting portion 31. The two retaining tubes 34 define a respective axial through hole that extends in a different axial direction. The two axial through holes can be directly formed in the arched board 30 by a hole-drilling technique. The arched board 30 is inserted with its one end into the through hole 15 of the frame 10, and the locating member 16 is inserted through the axial through hole of one retaining tube 34 of the arched board 30. By means of coupling between the retaining tube 34 and the locating member 16, the arched board 30 and the frame 10 are positively secured together. The two buffer members 60 are respectively set between the two opposite sides of the arched board 30 and the two opposing lateral walls of the through hole 15 of the frame 10.

It is to be understood that fastening devices for enabling the arched board and the locating member to be fastened together can be provided at the arched board or the frame without departing from the scope of the invention.

Alternatively, the frame can be made without the aforesaid through hole, and the arched board can be directly fastened to one lateral side of the frame.

Further, the locating member can be an independent member separately made and then mounted in the frame. Alternatively the locating member can be made integral with the frame.

In conclusion, the invention uses certain basic component parts to construct a product in one of multiple forms by means of different joining methods for use in different child developing stage to fit different learning requirements. Further, the basic component parts of the present invention are repeatedly usable, avoiding unnecessary waste of materials and money.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An assemble multipurpose pushbike, comprising:
a frame having one end thereof equipped with a handlebar, said frame comprising a locating member;
a front wheel having a wheel axle pivotally coupled to an opposite end of said frame;
two arched boards clamped on two opposite lateral sides of said locating member, each said arched board comprising a mounting portion located on one end thereof, a pivot holder located on an opposite end thereof, a connection portion located on a middle part thereof, and two positioning matching means disposed in an inner side of said mounting portion and selectively attached to said locating member, each said positioning matching means having a respective axial direction;
a rear wheel set pivotally coupled between the pivot holders of said arched boards for free rotation relative to said arched boards; and
a seat comprising a seat pad and a seat stem, said seat stem being set between said two arched boards and affixed to the connection portion of each said arched board.

2. The assemble multipurpose pushbike as claimed in claim 1, wherein each said positioning matching means is a retaining groove.

3. The assemble multipurpose pushbike as claimed in claim 1, wherein each said positioning matching means is one of a retaining tube and a through hole.

4. The assemble multipurpose pushbike as claimed in claim 1, wherein said locating member of said frame is a round rod.

5. The assemble multipurpose pushbike as claimed in claim 1, wherein said frame comprises a through hole located on a middle part thereof; said locating member is disposed in the through hole of said frame; said arched boards each have one end thereof inserted into the through hole of said frame.

6. The assemble multipurpose pushbike as claimed in claim 5, further comprising two buffer members mounted in the through hole of said frame and respectively set between said two arched boards and two opposite lateral sides of the through hole of said frame.

7. The assemble multipurpose pushbike as claimed in claim 1, wherein the mounting portions of said two arched boards are affixed together by screw bolts.

8. An assemble multipurpose pushbike, comprising:
- a frame having one end thereof equipped with a handlebar, said frame comprising a locating member;
- a front wheel having a wheel axle pivotally coupled to an opposite end of said frame;
- at least one arched board, said arched board comprising a mounting portion located on one end thereof, a pivot holder located on an opposite end thereof, a connection portion located on a middle part thereof, and two positioning matching means disposed in said mounting portion and selectively attached to said locating member, each said positioning matching means having a respective axial direction;
- a rear wheel set pivotally coupled between the pivot holders of said arched boards for free rotation relative to said arched boards; and
- a seat comprising a seat pad and a seat stem, said seat stem being affixed to the connection portion of said arched board.

9. The assemble multipurpose pushbike as claimed in claim 8, wherein each said positioning matching means is a retaining groove.

10. The assemble multipurpose pushbike as claimed in claim 8, wherein each said positioning matching means is one of a retaining tube and a through hole.

11. The assemble multipurpose pushbike as claimed in claim 8, wherein said locating member of said frame is a round rod.

12. The assemble multipurpose pushbike as claimed in claim 8, wherein said frame comprises a through hole located on a middle part thereof; said locating member is disposed in the through hole of said frame; said at least one arched board has one end thereof inserted into the through hole of said frame.

13. The assemble multipurpose pushbike as claimed in claim 12, further comprising two buffer members mounted in the through hole of said frame and respectively set between two opposite sides of said at least one arched board and two opposite lateral sides of the through hole of said frame.

14. The assemble multipurpose pushbike as claimed in claim 8, wherein the mounting portion of said arched board is affixed to said frame by a fastening device.

\* \* \* \* \*